Figures 1, 2, 3:
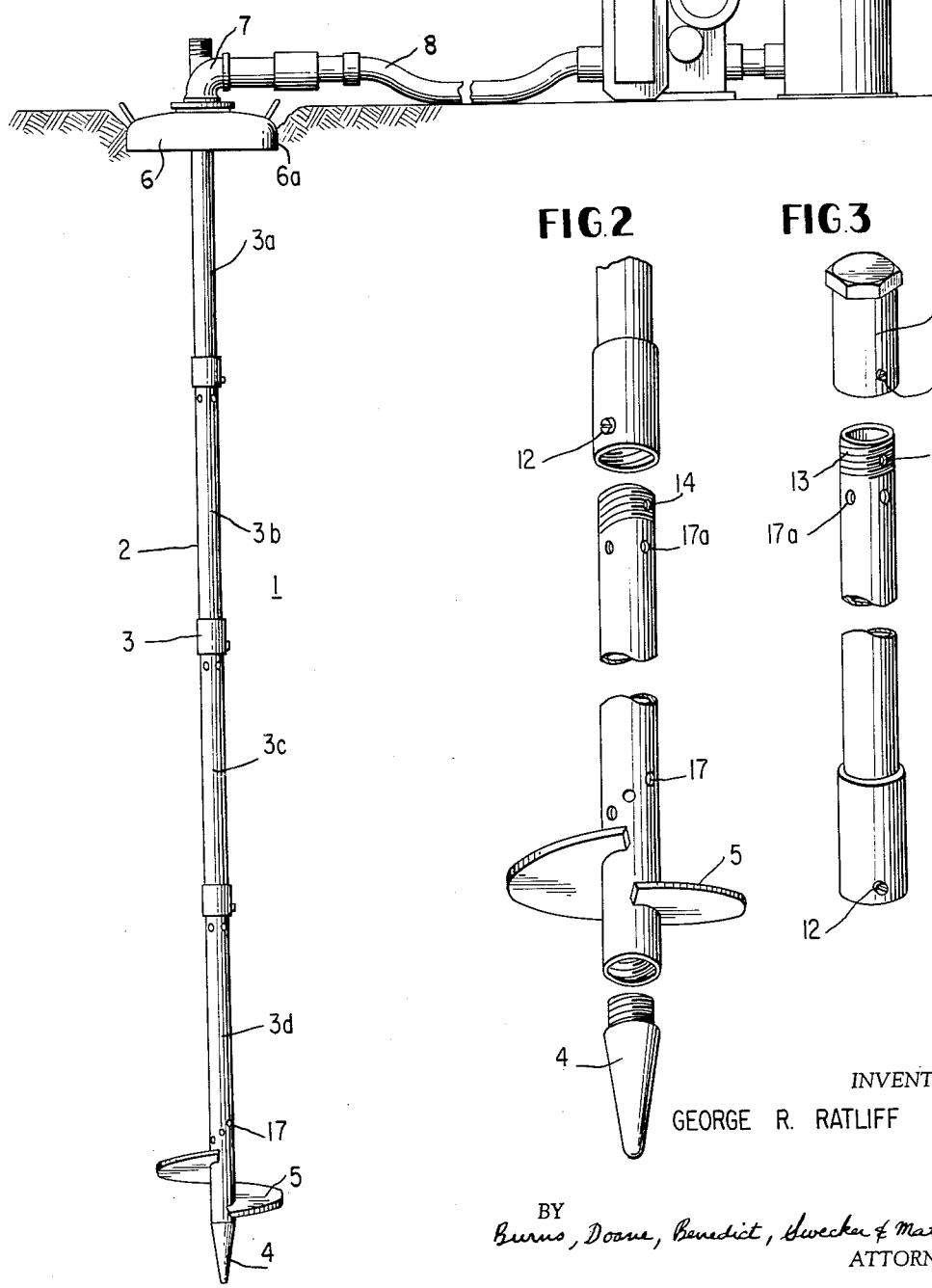

April 5, 1966 G. R. RATLIFF 3,243,962
METHOD AND APPARATUS FOR TREATING SOIL
Filed April 17, 1961 3 Sheets-Sheet 1

INVENTOR
GEORGE R. RATLIFF

BY
Burns, Doane, Benedict, Swecker & Mathis
ATTORNEYS

April 5, 1966        G. R. RATLIFF        3,243,962

METHOD AND APPARATUS FOR TREATING SOIL

Filed April 17, 1961        3 Sheets-Sheet 2

INVENTOR
GEORGE R. RATLIFF

BY
Burns, Doane, Benedict, Swecker & Mathis
ATTORNEYS

April 5, 1966   G. R. RATLIFF   3,243,962
METHOD AND APPARATUS FOR TREATING SOIL
Filed April 17, 1961   3 Sheets-Sheet 3
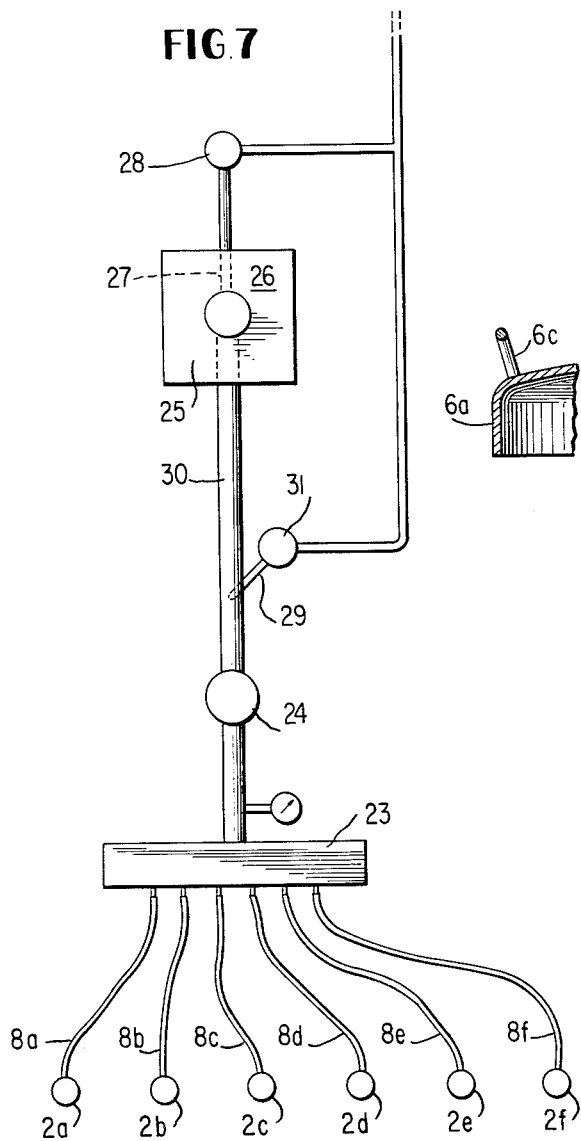
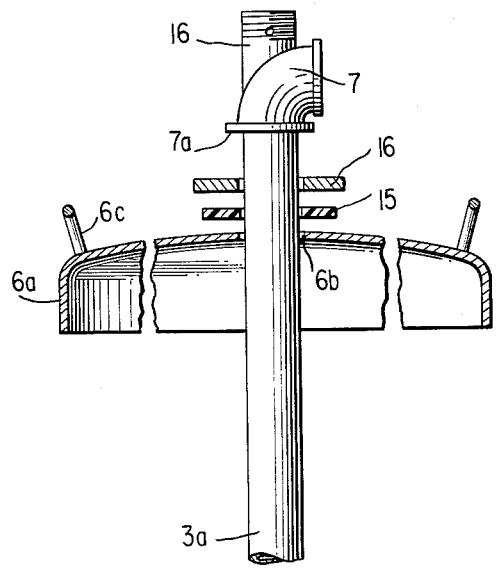
INVENTOR
GEORGE R. RATLIFF
BY
Burns, Doane, Benedict, Swecker & Mathis
ATTORNEYS

United States Patent Office 3,243,962
Patented Apr. 5, 1966

3,243,962
METHOD AND APPARATUS FOR TREATING SOIL
George R. Ratliff, 817 Alvaredo St., Jackson, Miss.
Filed Apr. 17, 1961, Ser. No. 103,508
3 Claims. (Cl. 61—36)

This invention relates to a method and apparatus for treating soils. In particular it is concerned with the stabilization of such clay soils as bentonite.

In many geographical areas, there are encountered soils having a predominating clay content. Especially where this clay is bentonitic, substantial problems are encountered during construction and excavation operations due to the tendency of the soil to lose its self-sufficiency in the presence of even moderate quantities of moisture. This phenomenon is a direct consequence of the low internal friction, bearing, and shear strengths of the clay constituent.

The physical characteristics of clay which contribute to its undesirable structural properties may in certain instances be drastically changed by altering the chemical structure of the clay itself. For example, it has been found that by treating Mississippi Yazoo clay with a slurry of calcium hydroxide, the plasticity of the clay is substantially reduced.

While it is known that clay soils may be stabilized by a lime treatment, considerable difficulty has been encountered in providing an efficient technique for disseminating lime into masses of clay soil. In one previously employed technique, a large number of holes are drilled into a clay body and the hole cavities are filled with lime. As will readily be appreciated, however, the migtration of the lime from the cavities into the soil body is both slow and limited in extent.

Recognizing the need for an improved soil stabilization technique, it is an object of this invention to provide a method and apparatus for saturating soil with a treating fluid which enables rapid fluid injection.

It is a further object of this invention to provide such a method and apparatus by means of which fluid will radially disseminate into the soil to a high degree.

It is an additional object of this invention to provide a method and apparatus for injecting soil stabilizing fluid wherein fluid is injected progressively in a stratified manner along an injection bore hole so as to minimize the fluid pressures required to effect entry of the fluid into the soil.

A still further object of this invention is to provide a soil-treating-fluid injection apparatus which is characterized by unique structural simplicity, by ease of field handling, and which is readily adaptable to being employed in soil bodies of different depths.

A particular and final object of the invention is to provide a method and apparatus for efficiently disseminating a calcium hydroxide slurry within clay strata.

To accomplish the foregoing objects, there is contemplated a method of treating clay soils in which a calcium hydroxide slurry is pressure injected into the clay. In a preferred technique, an elongate conduit means having radially extending, valved outlets is inserted and anchored within a soil mass. The conduit means is sealed to the surface of the soil mass following which treating fluid is forced therethrough under pressure. The valved outlets in the conduit means may be progressively opened away from the embedded end of the conduit means toward its surface end such that the soil surrounding the conduit means is progressively saturated with treating fluid.

The apparatus for use in the soil treating method of this invention includes conduit means for conducting fluids under pressure to the interior of a soil mass, means for holding the conduit means in place in the soil and means for sealing the conduit to the soil surface. There may also be provided means for expelling fluid radially of the conduit means progressively along the conduit means axis.

Figure 4:
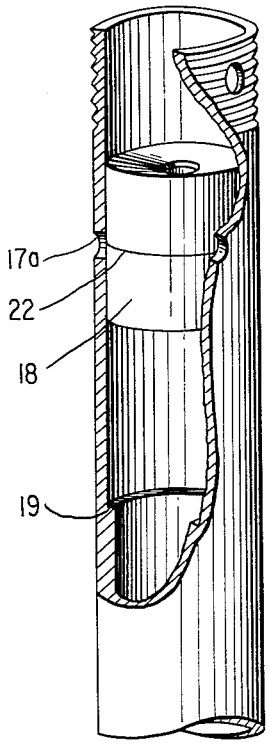
Figure 5:
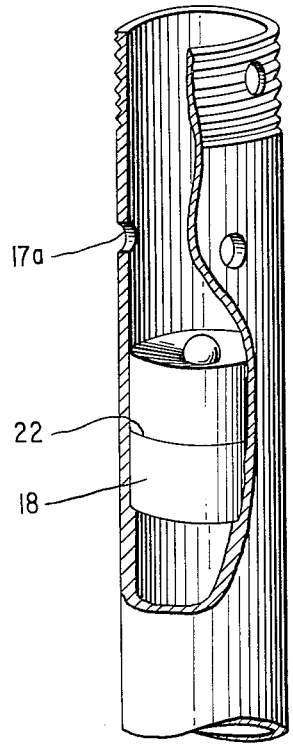
Figure 6:
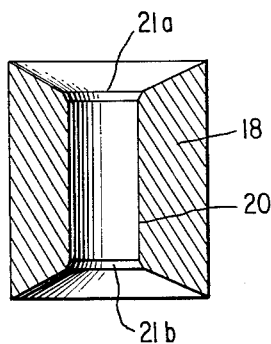

In describing this invention in detail, reference will be made to a preferred embodiment of the apparatus shown in the accompanying drawings in which:

FIGURE 1 is a partially sectioned, elevational view of a fluid injection apparatus positioned within a soil mass, FIGURE 2 is an enlarged view of the lower end of the apparatus showing its components axially separated for purposes of clarity, FIGURE 3 is an enlarged view of a conduit section employed in the apparatus showing an axially displaced driving cap, FIGURE 4 is a partially sectioned view of an upper end of a conduit section showing a valved fluid outlet in closed outlet position, FIGURE 5 is a partially sectioned view of a valved inlet portion of a conduit section showing the outlet in open position, FIGURE 6 is an enlarged sectional view of a valving sleeve embodied in the apparatus, FIGURE 7 is a schematic view of a slurry supplying system employed with the injection apparatus, and FIGURE 8 is an enlarged sectional view of the surface end of the injection apparatus showing a soil sealing cap in detail.

In FIGURE 1 there is shown a clay soil mass 1 into which a fluid injecting apparatus 2 has been inserted. Apparatus 2 includes conduit means 3 having a number of end to end connected conduit sections 3a, 3b, 3c, and 3d. The end of conduit means 3 is sealed by a tapered drive point 4.

On the lowermost section 3d of conduit means 3, an augur blade 5 is coaxially and rigidly mounted. At the surface of the soil mass 1 a cap 6 is provided for effecting a seal between the periphery of the upper conduit means section 3a and the ground surface. Cap 6 sealingly engages the outer periphery of section 3a and extends generally laterally outwardly from this conduit section to terminate in an annular lip 6a which sealingly engages the soil mass surface.

The uppermost end of the conduit means 3 is provided with a coupling 7 for connection with a source of pressurized treating fluid. In the form of the apparatus illustrated in FIGURE 1, coupling 7 is connected with a hose 8 extending from a pump 9 which pressurizes treating fluid supplied from reservoir 10.

In positioning the sectionalized conduit 3 within the soil mass, the lowermost, augur blade carrying, section 3d is placed with its point 4 in contact with the soil surface. On the upper end of the section 3d a drive head 11, illustrated in FIGURE 3, is threadably engaged with the male threaded portion on the upper end of conduit section 3d. To rigidly interconnect the drive head 11 and the conduit section, a set screw or pin 12 is transversely inserted through an opening in drive head 11 to engage the wall of the conduit section 3d. To insure positive engagement between the head 11 and conduit section 3d, the threaded terminus 13 of the section may be provided with an opening 14 for receiving the set screw or pin 12.

By connecting a manual or portable power tool to the drive head 11, the conduit section may be forcibly rotated. By imparting right hand rotation to the conduit, the augur blade shown in FIGURES 1 and 2 will positively force the section 3d into the soil mass. When the conduit section 3d becomes nearly embedded in the mass, the drive head 11 is removed and the succeeding section 3c rigidly coupled to this embedded section. As with the drive head, a set screw or transversely extending pin is employed to interconnect the sections 3c and 3d. By then mounting drive head 11 on the upper terminus of section 3c, continued advancement of the conduit into the soil mass may be affected. By connecting suceeding conduit sections to the embedded portion of the conduit in end to end relationship, the entire conduit means is progressively augured into the interior of the soil mass 1.

As the last conduit section 3a to be employed is readied for connection to the embedded portion of the conduit string, the cap 6 is incorporated in the apparatus. As shown in FIGURE 8, cap 6 includes a central aperture 6b by means of which it may be slidably mounted upon conduit section 3a. To facilitate handling of the cap, handles 6c may be provided. A resilient, centrally apertured gasket 15 is provided for placement on conduit section 3a on top of the cap, as is a metallic, centrally apertured disc 16 for placement on top of the gasket.

Coupling 7 may be rigidly or detachably connected to the upper terminus of section 3a. If coupling 7 is rigidly connected, as by welding, the cap 6 and its associated gasket 15 and disc 16 may be placed over the upper protruding end of section 3b before section 3a is attached to this section or slipped on the lower end of section 3a before the section connection is made. If coupling 7 is detachably connected, the cap, gasket and disc, may be mounted from the upper end of section 3a before the coupling is mounted. In mounting the coupling, means such as a set screw or pin must be provided to non-rotatably interconnect the coupling and section 3a.

Coupling unit 7 includes a threaded stud 16 adapted to receive drive head 11. With drive head 11 threadably mounted on and set screw or pin connected to stud 16, section 3a may be rotatably forced into the soil mass so as to bring a lower, abutment defining, flat edge 7a of coupling 7 into engagement with the disc 16. As the conduit section 3a advances into the soil mass, the edge 7a of coupling 7 will force the metallic disc 16, gasket 15 and cap 6 toward the soil mass surface. Continued advancement of the section will cause the annular lip 6a of the cap to be embedded within the soil mass surface under the driving influence of the abutment 7a. By compressing gasket 15 and disc 16 between edge 7a and the upper surface of cap 6, a seal between cap 6 and the section 3a is achieved. This axial seal may be augmented by a radial expansion of gasket 15 into engagement with the outer periphery of conduit section 3a. In this manner there is achieved a seal between the cap and the conduit section as well as between the cap and the soil mass surface. It should also be recognized that the disc 16 functions as a thrust bearing to permit the abutment 7a to rotate while the cap lip 6a is being non-rotatably forced into the ground surface.

Spaced axially along the conduit means 3 are a plurality of radially extending fluid outlets, including outlets 17 generally spirally arranged in the vicinity of augur blade 5 on lower conduit section 3d. In the upper end of each conduit section, there are incorporated fluid outlets 17a having fluid pressure responsive valve means. This valved outlet structure, as shown in FIGURES 4 and 5, includes one or more co-planar outlets 17a and an axially slidable, longitudinally bored valving sleeve 18.

As shown in FIGURE 4, the upper end of each conduit section is longitudinally bored to receive a sleeve 18. The conduit section bore terminates at an annular abutment defining lip 19 positioned below outlets 17a at a distance at least equal to the length of the sleeve 18. Each sleeve 18, as shown in FIGURE 6, includes a longitudinally extending central bore 20 terminating in a ball receiving seat 21a at its upper end. To permit of the use of the apparatus with the sections inverted, a seat 21b at the lower sleeve end may also be provided. Seats 21, it is to be noted, are accentuatedly concave and extend inwardly from the inner conduit wall so as to positively insure ball seating in bore 20.

A sleeve 18 may be aligned within a conduit section to seal outlets 17a by inserting a rod or other tool into the conduit section to force the sleeve into a position where an alignment groove 22, extending peripherally around the sleeve, is visible through the outlets 17a. Sleeve 18, although slidable within the bored conduit portion, frictionally engages the conduit inner wall so as to be yieldable only in response to a longitudinally imposed force of predetermined magnitude.

When the conduit means 3 is initially inserted into the ground, the outlets 17a of each conduit section end are closed by a sleeve 18 as shown in FIGURE 4. The axially extending bores 20 of the valve sleeves 18 progressively diminish in diameter away from the cap end of the conduit string toward the embedded, augur carrying end. For example, the bore of the sleeve in conduit section 3a may be ⅞ inch in diameter, the bore in the sleeve of section 3b, ¾ inch in diameter, the bore in the sleeve of section 3c, ⅝ inch in diameter, and the bore in the sleeve of section 3d, ½ inch in diameter.

With a sleeve arrangement as described, the fluid outlets may be progressively opened in a direction away from the embedded end of the conduit by sequentially inserting balls into the cap end of the conduit of such size as to pass through all but the bore of the lowermost valving sleeve to be actuated. With the apparatus inserted and all outlets 17a closed, pressurized fluid will be initially expelled through lower outlets 17 in conduit section 3d. With sleeves having bores dimensioned as indicated, if a $17/32$ inch steel ball is then inserted in the cap end of the conduit, it will pass through the sleeves of sections 3a, 3b, and 3c and lodge in the ball receiving seat 21a of the sleeve in section 3d. When fluid being transmitted to the conduit means 3 is pressurized to a point sufficient to apply the predetermined longitudinal force necessary to move the closed sleeve 18 in section 3d, the sleeve will move axially toward the embedded conduit end to uncover outlets 17a in section 3d. The lip 19 insures that the sleeve 18 will be retained in the upper end of the section. By sequentially inserting balls of $17/32$ inch, $21/32$ inch, $25/32$ inch and $29/32$ inch diameter, the valving sleeves in conduit sections 3d, 3c, 3b, and 3a may be progressively actuated by pressurizing the interior of the conduit after each ball is inserted. The sleeve actuated balls may be inserted by disengaging the coupling 7 from the hose 8 or by providing a separate inlet for inserting balls into the system for transmittal to the valving sleeves.

After the injection operation is completed, the illustrated apparatus may be withdrawn from the soil by imparting left hand rotation to the conduit string. The pinned conduit section and drive head connections obviate the possibility of apparatus disconnection occurring during this withdrawal.

With the apparatus described, a particularly expeditious and efficient dissemination of soil treating fluids may be accomplished. The apparatus enables the injection of even viscous fluids under high pressure into plastic soils of low permeability. It has been found, for example, that fluid pressures as high as two thousand pounds may be imposed in injecting a lime slurry into Yazoo clay. With an apparatus in which the conduit is of approximately 1¼ inch diameter, an auger blade having a diameter of approximately 6 inches will effectively anchor the conduit means 3 within the soil and prevent its being forced out of the soil under pressures of this magnitude. The loss of such high injection pressure as a result of injection fluid channeling around the pipe exterior to the ground surface is obviated by the cap 6 which effectively seals this normal channeling area. It has been determined that with a conduit of the dimension described, a cap having a diameter of approximately 20 inches will provide an adequate seal.

The maximum utilization of available treating fluid pressure is made possible through the sequentially actuated outlet system embodied in the apparatus. By progressively exposing the outlets of each section to pressurized fluid, the entire fluid pressure is made available at localized fluid injection levels. By thus concentrating injection pressure, a maximum radius of fluid dissemination through the soil is achieved.

It has been determined that to stabilize clay soils by calcium hydroxide slurry injection, there should be an amount of slurry injected equal to approximately 3% to 5% of the weight of soil being treated. A preferred slurry has 40% by weight of lime and 60% by weight of water. However, satisfactory results may be obtained with slurries having between 30% and 45% by weight of lime and between 70% and 55% by weight of water. Such slurries may also include additional additives such as fly ash to compensate for a soil silica deficiency or other well known soil treating additives. Additionally there may be incorporated a water wetting agent to improve the degree of lime dispersion, facilitate slurry penetration into the soil, and accelerate the reaction between the lime and clay.

Where treating large soil areas, the structure of the injection unit particularly facilitates the simultaneous operation of several units. As shown in the plan view of FIGURE 7, for example, injection tools 2a through 2f are connected by means of conduits 8a through 8f respectively, with a central manifold 23. A lime slurry is forced into the manifold 23 from a conventional slurry pump 24. In the usual practice, the slurry supplied to the pump is field mixed in a conventional jet type mixer 25. Jet mixer 25 includes a hopper 26 which discharges powdered lime downwardly into the path of a horizontal water jet 27 supplied by water pump 28. The consistency of the slurry passing from the mixer 25 may be regulated by a water injection line 29 supplying thinning water to the mixer outlet conduit 30, which water may be pressurized by water pump 31. As illustrated, water pumps 28 and 31 may extend to a common water source.

For purposes of convenience, the mixing and manifold shown schematically in FIGURE 7 may be vehicle mounted. It is contemplated, for example, that where the apparatus is to be employed in stabilizing railway road beds, a system carrying vehicle may be provided with conventional rubber tired wheels as well as with retractable railway wheels to enable the vehicle to move either on railways or conventional highways.

By reference to a preferred embodiment of the apparatus, there have been demonstrated the several advantages inherent in the soil stabilizing technique of this invention. The structure of the apparatus enables efficient pressure injection of viscous treating fluids in plastic soils by permitting the imposition of exceptionally high pressures on injection fluids. It is adaptable to treating soil masses of widely varying areas and depths and is such as to facilitate field use by unskilled personnel and to require only nominal maintenance. The apparatus components required, for the most part, are conveniently available.

The soil injection technique of this invention has been described in detail with reference to a preferred form of apparatus. It is apparent, however, that minor modifications in the apparatus and specifically described method of employing it may be affected within the scope of this invention. For example, the injection conduit may be inclined rather than vertically inserted into a soil mass, the conduit sections may be inverted, any number of conduit sections or alternatively an integral conduit may be employed, and connecting means for joining the apparatus components may be other than those specifically disclosed. The scope of the overall invention is deemed to be defined in the appended claims.

I claim:

1. A method of stabilizing clay soils comprising: the inserting and anchoring of elongate conduit means having axially spaced, radially extending fluid outlets each of which is provided with an initially closed, independently movable valve means, said elongate conduit means having an auger blade on the end thereof to be first inserted, the insertion being effected by rotating said elongate conduit means whereby said auger blade pulls said conduit means into the soil, and the anchoring being effected by said auger blade which resists extraction of said conduit means without rotation, the sealing of the area around said conduit means at the surface of said soil mass by connecting a cap to said anchored conduit means, the forcing of a soil stabilizing slurry under pressure through said conduit means, and the opening of said axially spaced fluid outlets in said conduit means in a sequential order from the embedded end of said conduit means toward the surface of said soil mass by first moving the valve means nearest the embedded end of said conduit means and proceeding thereafter to move each successive valve means whereby the clay soil surrounding said conduit means at points remote therefrom is progressively saturated with the slurry.

2. A method of saturating soil with a treating fluid comprising the steps of inserting into the soil a conduit by rotating a first length of conduit having an auger blade; increasing the distance the conduit extends into the soil by adding in succession additional lengths of conduit and rotating each length as it is added, whereby the auger blade pulls the conduit into the soil and anchors it; said lengths of conduit having normally closed valve means for controlling the flow of fluid generally radially from the conduit, sealing the area around the conduit at the soil surface to prevent the flow of fluid along the conduit by connecting a cap to the anchored conduit near the soil surface; forcing a treating fluid through the conduit and into the soil to points remote from the conduit by actuating the valve means furthest in the soil to allow the fluid to leave the conduit, and then actuating successively the valve means in the other lengths of conduit to allow the fluid to leave the conduit at selected points at different times so that the full force of the fluid pressure leaving the conduit may be concentrated at said valve means.

3. An apparatus for injecting treating fluid into soil comprising: elongate conduit means, said conduit means having radially extending fluid outlets; an auger blade coaxially and rigidly mounted on the lower end of said conduit means, drive means carried by said conduit means and adapted for driving connection with means for imparting axial rotation to said conduit means and auger blade, said auger blade being of the type which will pull said conduit means into the soil when rotated in one direction and force said conduit means out of the soil when rotated in the other direction, coupling means carried by said conduit means for connection with a source of pressurized treating fluid, and fluid pressure responsive valve means for at least one of said outlets, said valve means comprising a valving sleeve coaxially and slideably mounted within said conduit means and having an axially extending bore terminating in a ball receiving seat facing the cap end of said conduit means, whereby, with said sleeve positioned adjacent an outlet, a ball inserted in the cap end of said conduit means to engage said ball receiving seat of said sleeve and thus close said sleeve bore will cause said sleeve to be axially moved by fluid pressure away from said cap end and uncover said outlet.

References Cited by the Examiner

UNITED STATES PATENTS

| | | | |
|---|---|---|---|
| 2,181,540 | 11/1939 | Adams | 111—7.1 |
| 2,196,652 | 4/1940 | Baker | 166—156 |
| 2,203,881 | 6/1940 | Schwab et al. | 61—36 X |
| 2,370,833 | 3/1945 | Baker | 166—153 |
| 2,560,619 | 7/1951 | Wertz | 61—36 |
| 2,782,605 | 2/1957 | Wertz | 61—36 |
| 2,909,901 | 10/1959 | Suderow | 61—46.5 |

FOREIGN PATENTS

| | | |
|---|---|---|
| 405,767 | 2/1934 | Great Britain. |
| 611,595 | 11/1948 | Great Britain. |

OTHER REFERENCES

Engineering News-Record: August 17, 1939, page 61.

CHARLES E. O'CONNELL, *Primary Examiner.*

JACOB L. NACKENOFF, BENJAMIN BENDETT, *Examiners.*